United States Patent
Gorti et al.

(10) Patent No.: US 12,481,655 B1
(45) Date of Patent: Nov. 25, 2025

(54) METHODS AND SYSTEMS FOR PROVIDING QUERY METRICS

(71) Applicant: TARGET BRANDS, INC., Minneapolis, MN (US)

(72) Inventors: Karthik Gorti, Bengalaru (IN); Payal Verma, Patna (IN); Deepa Sarasamma, Plymouth, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 0 days.

(21) Appl. No.: 18/932,179

(22) Filed: Oct. 30, 2024

(51) Int. Cl.
  *G06F 16/2453* (2019.01)
  *G06F 16/248* (2019.01)

(52) U.S. Cl.
  CPC ...... *G06F 16/24549* (2019.01); *G06F 16/248* (2019.01)

(58) Field of Classification Search
  CPC .......................... G06F 16/24549; G06F 16/248
  See application file for complete search history.

(56) References Cited

U.S. PATENT DOCUMENTS

| | | | |
|---|---|---|---|
| 8,447,751 B2 * | 5/2013 | Stouffer | G06F 16/24578 717/124 |
| 9,128,945 B1 | 9/2015 | Shukla et al. | |
| 10,756,990 B1 * | 8/2020 | Chakkassery Vidyadharan | G06F 11/301 |
| 11,093,496 B1 * | 8/2021 | Bhatia | G06F 16/24552 |
| 11,100,113 B2 | 8/2021 | Murphey et al. | |
| 11,216,461 B2 | 1/2022 | Nawrocke et al. | |
| 11,675,473 B1 * | 6/2023 | Breeden | G06F 3/04847 715/738 |
| 11,714,823 B1 * | 8/2023 | Breeden | G06F 16/24556 707/602 |
| 11,741,096 B1 * | 8/2023 | Kanuparthy | G06F 16/9024 707/716 |
| 12,292,886 B2 * | 5/2025 | Beresniewicz | G06F 11/3409 |
| 2017/0286499 A1 * | 10/2017 | Bingham | G06F 11/301 |
| 2018/0089328 A1 * | 3/2018 | Bath | G06F 16/901 |
| 2019/0095508 A1 * | 3/2019 | Porath | G06F 16/34 |
| 2019/0108230 A1 * | 4/2019 | Prakash | G06F 16/24578 |
| 2020/0142894 A1 * | 5/2020 | Papaemmanouil | G06F 16/2453 |
| 2020/0356563 A1 * | 11/2020 | Nawrocke | G06F 16/2452 |
| 2021/0334274 A1 * | 10/2021 | Teo | G06F 16/2477 |
| 2024/0265015 A1 * | 8/2024 | Badii | G06F 16/24545 |
| 2024/0311736 A1 * | 9/2024 | Sriram | G06Q 10/06393 |
| 2025/0139103 A1 * | 5/2025 | Sharma | G06F 16/2455 |

FOREIGN PATENT DOCUMENTS

WO  WO-2017015792 A1 * 2/2017 ......... G06F 16/9535

* cited by examiner

*Primary Examiner* — Jorge A Casanova
(74) *Attorney, Agent, or Firm* — Dorsey & Whitney LLP (57) ABSTRACT

The present disclosure relates generally to scoring queries based on accesses to databases. The scoring of a query can include generating a sub-score for each of one or more query metrics and generating an overall score for the query using at least some or all of the sub-scores. Additional information that is associated with the query may also be determined. User inputs can be received to modify the scoring of the queries, to modify the information presented in a user interface, and/or to modify the determination of some or all of the additional information.

20 Claims, 8 Drawing Sheets

| OVERALL QUERY SCORE | LATENCY SCORE | PAYLOAD SCORE | SCAN SCORE | # OF EXECUTIONS | QUERYID | SHORT QUERY |
|---|---|---|---|---|---|---|
| 4 | 9 | 0 | 9 | 13962 | -8086401613837170 | SELECT NAME, SETTING, COALESCE (BOOT VAL, $1), SOURCE, COALESCE (SOURCEFILE, $2), COALESCE (SOURCELINE, $3) FROM PF SETTINGS OR... |
| 4 | 8 | 8 | 1 | 13962 | 8827227959431120 | SELECT CURRENT DATABASE() AS DB, SCHEMANAME, TABLENAME, RELTUPLES::BIGING AS TUPS, RELPAGES:: BIGINT AS PAGES, OTTA, ROUND (CAS... |
| 7 | 9 | 0 | 10 | 13962 | -3129672183081720 | SELECT NAME FROM PG IS WALDIR() WHERE NAME ~ $1 |
| 7 | 9 | 0 | 9 | 13962 | -4853132633274450 | SELECT USERID, DBID, QUERYID, LEFT (COALESCE (QUERY, $3), $1) CALLS, TOTAL TIME, MIN TIME, MAX TIME, STDDEV TIME, ROWS, SHARED BLK... |
| 7 | 9 | 9 | 5 | 2533373 | -5276923397597530 | SELECT MAX (VIDXREAD) AS VIDXREAD, MAX (VIDXHIT) AS VIDXHIT, MAX (VRATIO) AS VRATION FROM (SELECT $1 AS VIDXHIT, $2 AS VIDXHIT, $3 AS VRA... |
| 7 | 9 | 9 | 6 | 13962 | -5810108479035740 | SELECT INDEXRELID, PG GET INDEXDEF (INDEXRELID) FROM PG STAT USER INDEXES |
| 7 | 9 | 9 | 6 | 2633366 | -6755040294333420 | SELECT MAX (HEAD READ) AS HEAD READ, MAX (HEAP HIT) AS HEAP HIT, MAX (HEAP RATIO) AS RATION FROM (SELECT $1 AS HEAP READ, $2... |
| 7 | 9 | 8 | 7 | 249 | 4017905075808120 | SELECT COLS.COLUMN NAME AS COLUMN NAME, COLS.DATA TYPE AS DATA TYPE, (SELECT COALESCE (PG CAALOG.COL DESCRIPTION(C... |
| 7 | 9 | 9 | 6 | 41886 | 6166923139288860 | SELECT PG TABLE SIZE ($1) |

METHODS AND SYSTEMS FOR PROVIDING QUERY METRICS

TECHNICAL FIELD

The present disclosure relates generally to database management, and more specifically to the performance of queries in database management.

BACKGROUND

Many organizations rely on the efficiency of their databases, and more specifically, on the efficiency of queries that are used to access their databases. Poor query performance can be detrimental to the efficiency of a database. Currently, identifying the cause of poor query performance can be difficult. It may take a significant amount of time to identify the issue(s) associated with a query and determine the reasons for the query's poor performance.

BRIEF SUMMARY

In one aspect, a system includes a processor and a memory. The memory is configured to store a database and processor-executable instructions, that when executed by the processor, cause operations to be performed. The operations can include receiving, from a computing device, a query and accessing the database to analyze query data based on the query. A sub-score for each query metric in a set of query metrics is determined. In one embodiment, the set of query metrics comprise service level indicators such as scan, latency, and payload. An overall score for the query is determined using at least the sub-scores. The overall score and each query metric in the set of query metrics and the sub-score associated with the query metric are transmitted to the computing device.

In another aspect, a method includes receiving a query and accessing a database based on the query. A sub-score for each query metric in a set of query metrics is determined based on accessing the database. An overall score for the query is determined using some or all of the sub-scores for the query metrics in the set of query metrics. A user input is received to select additional information to be determined, where the additional information is associated with the query. A user interface (UI) configured to present each query metric and the sub-score associated with the query metric, the overall score for the query, and the additional information is provided.

In yet another aspect, a method includes receiving, from a computing device, a query and accessing a database based on the query. While accessing the database, a sub-score for each query metric in a set of query metrics is determined. In one embodiment, the set of query metrics includes latency, scan, and payload. An overall score for the query using each sub-score is determined. A first user interface (UI) that is configured to display the overall score, each query metric and the sub-score associated with the query metric, and an input element configured to receive user inputs is transmitted to the computing device. A user input to select additional information to be determined is received, where the additional information associated with the query. The additional information is determined, and a second UI configured to display at least the additional information is transmitted to the computing device.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

All databases have a core unit of work that is executed (e.g., "queries"). Generally, queries are instructions that database management systems understand. A query may include, for example, a request for data from a database, an action on the data, or both. For example, a query may produce information as search results or as an answer to a question, perform calculations on data stored in the database, combine data (e.g., combine data from different tables or add or change query data), or delete data from the database.

Many users and/or systems can use a user interface to submit a query to access a database stored on or connected to a computing device (e.g., a computer server). The performance of the query can impact the efficiency of the database. In one example, a user that executed the query can receive a query response from the database in a timely manner. In another example, the user that executed the query cannot receive a query response from the database or the query response is returned to the user at a slower rate and/or with a higher amount of query data in the query response. Thus, a poor query performance can reduce the efficiency of the database. Additionally, many users and/or systems expect fast query responses when interacting with databases. A poor query performance can significantly decrease the user's experience.

The present disclosure relates generally to scoring queries to assist in identifying poor performing queries. The scoring of a query can include generating a sub-score for each of one or more query metrics and generating an overall score for the query using the sub-score(s). A query metric may be a service level indicator (SLI) for a database. Example query metrics include, but are not limited to, latency, scan, and payload. In one embodiment, latency is based on the total amount of time taken by a query calculated over the number of calls, scan is based on the number of blocks scanned to return a single row in the query response, and payload is based on the total number of rows returned by a query calculated over the number of calls. In a non-limiting nonexclusive example, latency is based on the total amount of time taken by a query averaged over the number of calls and payload is based on the total number of rows returned by a query averaged over the number of calls. Other embodiments can perform a different calculation for latency and a different calculation for scan (the calculations can be the same type of calculation or different types of calculations).

In some embodiments, additional information associated with the query can be determined. In non-limiting nonexclusive examples, the additional information includes a total number of queries, a count of queries having an overall score equal to or greater than a threshold, a percentage of sub-optimal queries, a count of queries having an overall score equal to or less than the threshold, trend information, and/or a percentile score.

The overall score, the query metrics and associated sub-scores and/or the additional information may be displayed in a query score dashboard in a user interface. The query score dashboard may provide information on the performance of the query. The query score dashboard can be used by application teams, developers, information technology (IT) workers, or the like to monitor query performance and identify a query and/or a query metric that is associated with the performance issues of the query. For example, the user can use a system or interface (referred to as an apparatus) to transmit a query and a query performance request to a database to receive a query score dashboard at any time during or after execution of the query. In another example, the database may automatically provide the query score dashboard to the user. In some embodiments, the query score dashboard can display some or all of the overall score, the query metrics and associated sub-scores, and/or the additional information associated with the query.

In at least one example, a system can include a processor and a memory configured to store processor-executable instructions, that when executed by the processor, cause operations to be performed. The operations can include receiving a query and accessing one or more databases based on the query. Query data can be analyzed and sub-scores for a set of query metrics are determined. Query data includes data that is stored in one or more databases that is searched, accessed, or acted upon based on the query. In one embodiment, the set of query metrics includes scan, latency, and payload, although other embodiments are not limited to these query metrics.

The operations can further include determining an overall score for the query using at least the sub-scores that were determined for the query metrics. A query is considered more optimal when the sub-scores for the query metrics (e.g., latency, scan, and/or payload) are relatively low and the overall score for the query is relatively high. The overall score and/or each sub-score is transmitted to the computing device to enable the overall score and/or the sub-score(s) to be displayed.

The operations can further include generating a user interface (UI) that can be configured to display the overall score for the query and/or one or more sub-scores for the query metrics. The UI can further present additional information, such as trend information and/or comparisons or rankings of the query score relative to other scores or based on a threshold. For example, the UI can present a weighted overall score for the query, a $25^{th}$ percentile score, a $5^{th}$ percentile score, a percent of sub-optimal queries, and/or other information associated with a query. In this way, a user can monitor the performance of a query. Furthermore, the user can identify low performing queries and determine which query metric needs attention. Additionally, objective comparisons between queries may be performed based on the query scoring disclosed herein.

In at least one example, the UI can be configured to receive user inputs in relation to the query metric sub-scores and/or the additional information. The user can input a modification to a threshold that can be associated with a sub-score and/or with some of the additional information. In this way, by changing the threshold, the user can customize how a sub-score for a query metric is determined or ranked when compared to other queries. In some embodiments, a new sub-score for a query metric can be determined based on a user input and an updated or new UI may be provided. For example, a percentile score can be changed from the $25^{th}$ percentile score to the $20^{th}$ percentile or the $50^{th}$ percentile. In this way, the user can fully customize the data displayed on the query score dashboard and how the performance of a query is tracked. In other examples, as discussed in more detail below, the UI displaying the query score dashboard can be configured to display multiple panels that are customizable by the user.

Figure 1:
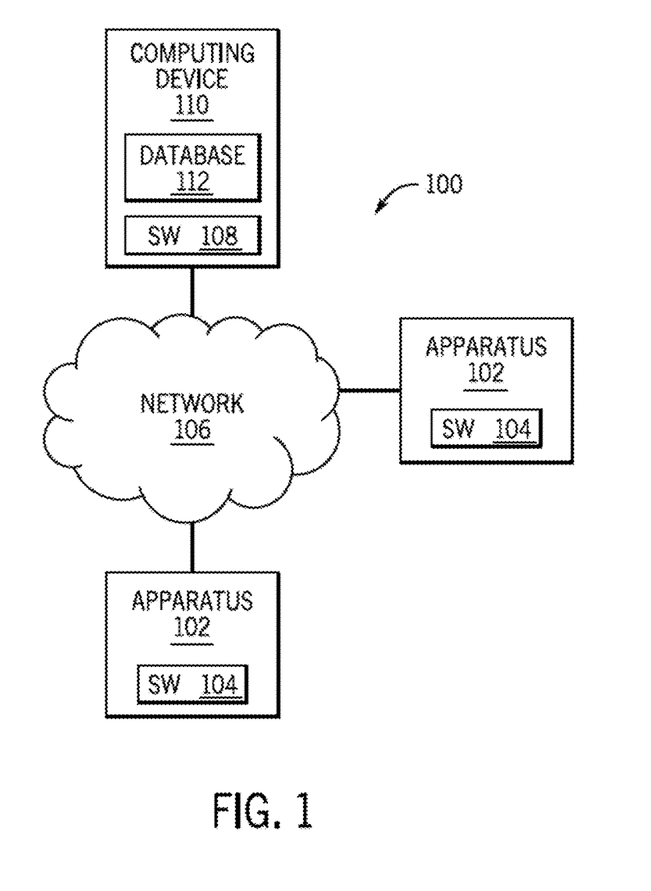
FIG. 1 illustrates a block diagram of an example system for scoring queries in accordance with an embodiment of the disclosure.

FIG. 1 illustrates a block diagram of an example system 100 for scoring queries in accordance with an embodiment of the disclosure. The system 100 can include at least one apparatus 102 that can include software 104, such that the apparatus 102 and the software 104 can access a network 106. In one example, the user can input a query from the apparatus 102 using the software 104. Example apparatuses include, but are not limited to, a smart phone, a tablet, a computer, a laptop, a wearable device, a distributed computing system, or the like. The network 106 can be configured as one or more systems and protocols for communications between computing devices. Example network systems include, but are not limited to, a wide area network, a local area network, an enterprise private network, the Internet, a cloud-based network, combinations thereof, or the like.

In at least one example, the apparatus 102 is configured to access a computing device 110 via the network 106. In one embodiment, the computing device 110 may be implemented as a desktop computer, a laptop computer, a server, a mainframe computer, or a distributed computing system. A query can be transmitted from the apparatus 102 over the network 116 to the computing device 110 to access one or more databases (collectively database 112) that are accessible by the computing device 110 (e.g., stored on the computing device 110). Software 108 on the computing device 110 can be configured to generate sub-scores for a set of query metrics and an overall score for the query based on the sub-scores. Additionally, the software 108 may be configured to determine additional information associated with the query. In one embodiment, at least the overall score and/or the sub-score(s) for the set of query metrics are generated as the query is being processed.

In at least one example, the software 108 may be configured to determine the overall score for the query and/or the sub-score for each of the query metrics, generate a UI, and transmit the UI, the overall score for the query, and the sub-scores for the query metrics to the apparatus 102. As illustrated in FIG. 1, more than one apparatus 102 can access the network 106 and the computing device 110 separately, concurrently or simultaneously.

Figure 2:
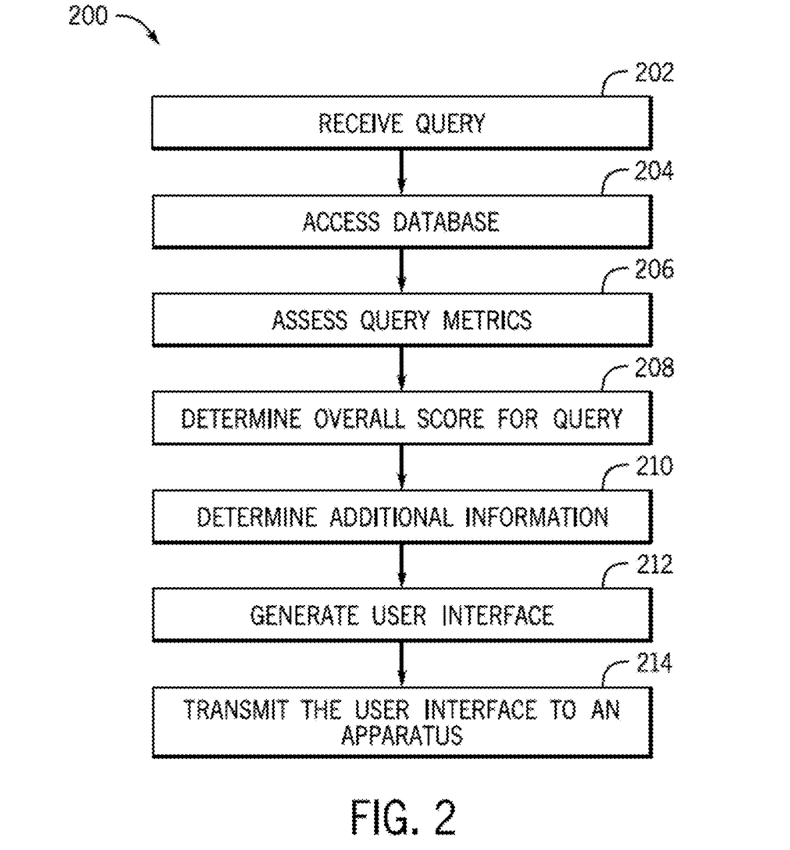
FIG. 2 illustrates a flowchart of a first example method of scoring queries in accordance with an embodiment of the disclosure.

FIG. 2 illustrates a flowchart of a first example method 200 of scoring queries in accordance with an embodiment of the disclosure. In one embodiment, the example method 200 can be performed by a computing device, such as the computing device 110 as shown in FIG. 1. The method 200 is described in conjunction with the processing of one query, although other embodiments are not limited to this implementation. In other embodiments, multiple users can transmit queries to be processed by the computing device concurrently or simultaneously.

At operation 202, a query is received from another computing device (e.g., the apparatus 102 of FIG. 1). In some embodiments, a UI can be configured such that the user can select which query metric(s) to analyze for the query. In another embodiment, one or more default query metrics can be used.

At operation 204, a database is accessed based on the query. The query can request a search be performed and/or an action be performed on the query data. At operation 206, the query metrics, as either default query metrics or query metrics selected by the user, can be assessed via the software on the computing device based on the database access. The sub-scores for the query metrics may be determined as the query is processed or after the query is processed. In one example, a sub-score is determined for latency, scan, and payload, and each sub-score can range between the numbers one and ten. For example, the number one may represent poor and the number ten good or excellent.

At operation 208, an overall score is determined for the query based on the sub-scores associated with the query metrics. In one embodiment, the overall score ranges between the numbers one and ten and the overall score is computed using a weighted average of the sub-scores based on the number of query executions corresponding to the overall score. For example, the weighted average can be determined using thirty percent (30%) of the latency sub-score, twenty percent (20%) of the payload sub-score, and fifty percent (50%) of the scan sub-score, although other embodiments are not limited to these percentage values. In other embodiments, a calculation other than a weighted average can be used to determine the overall score for the query.

At operation 210, additional information associated with the query can be determined. For example, the additional information can include percentile score for the query. The percentile score may be determined by ranking of all queries by their query score in descending order and identifying a certain percentile of the scores (e.g., $25^{th}$ percentile, $5^{th}$ percentile, etc.). In some embodiments, a percentage of queries that score below a threshold are determined. Additionally or alternatively, one or more trends may be determined, such as a trend of a mean query score over a period of time and/or a trend of a certain percentile (e.g., 30% percentile). Non-limiting nonexclusive examples of additional information are described in more detail in conjunction with FIGS. 4-7.

At operation 212, the software in the computing device can generate a UI (e.g., the software 108 in the computing device 110 of FIG. 1). In one embodiment, the UI can be configured to display the query metrics and associated sub-scores of the query metrics and the overall score of the query. In another example, the UI can further present additional information associated with the query. For example, the additional information may be displayed in one or more graphical panels within or separate from the UI. At operation 214, the UI is transmitted over the network to the apparatus to enable the UI to be displayed.

Figure 3:
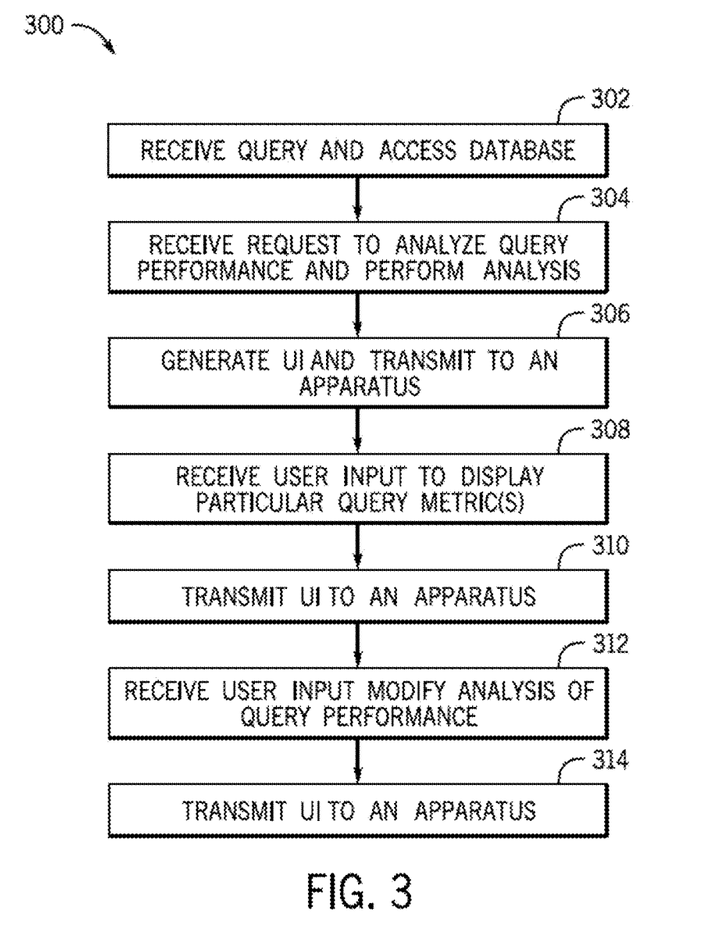
FIG. 3 illustrates a flowchart of a second example method of scoring queries in accordance with an embodiment of the disclosure.

FIG. 3 illustrates a flowchart of a second example method 300 of scoring queries in accordance with an embodiment of the disclosure. At operation 302, a user computer device, such as the user computer device 102 as seen in FIG. 1, can transmit a query to a computing device (e.g., the computing device 110 of FIG. 1). The computing device receives the query and responsively accesses a database based on the query. As described earlier, a query may include, for example, a request for data from a database, an action on the data, or both.

At operation 304, the computing device may receive a request for an analysis of the query performance and responsively analyze (e.g., score) the query. In one embodiment, the analysis includes the operations 206, 208, and 210 shown in FIG. 2. In some embodiments, the analysis may include generating one or more recommendations as to how the query may be improved. The recommendations can identify one or more of the query metrics that are underperforming. Additionally or alternatively, the recommendations may provide information that can improve the results of the additional information.

At operation 306, the computing device may generate a UI that is configured to display the overall query score, a sub-score for one or more query metrics, and/or additional information associated with the query and transmit the UI to the apparatus. When recommendations to improve the query are generated, the recommendations may also be displayed in the UI.

At operation 308, the computer device can be configured to receive a user input regarding one or more query metrics. In one example, the UI displayed on the apparatus can be configured to receive user inputs that are transmitted to the computing device. In this way, the user can provide inputs to modify the way information is displayed in the UI. For example, a user may want to view only the sub-scores for the query metrics or the additional information associated with the query. At operation 310, an updated or new UI is transmitted to the apparatus. The updated or new UI can be revised based on the user input(s) received at operation 308.

At operation 312, the computing device may receive one or more user inputs to modify the analysis of the query performance. In one example, the UI can be configured to receive a user input to modify the threshold at which the query score and/or the query metric sub-scores are measured. In this example, the user can customize the threshold value to account for any situation that can arise. In yet another example, the customization may help with identifying a certain issue with the performance of the query, such as a particular query metric associated with the query.

At operation 314, the computer device can transmit an updated or new UI to the apparatus to enable the updated or new UI to be displayed. The updates to the UI can be based on the user inputs received at operation 312. In this way, the user can easily see the results of the user inputs (e.g., the threshold changes) to the analysis of the query performance. This can be advantageous, as this process can significantly increase the efficiency of tracking, identifying, and fixing issues with query performance.

Figure 4:
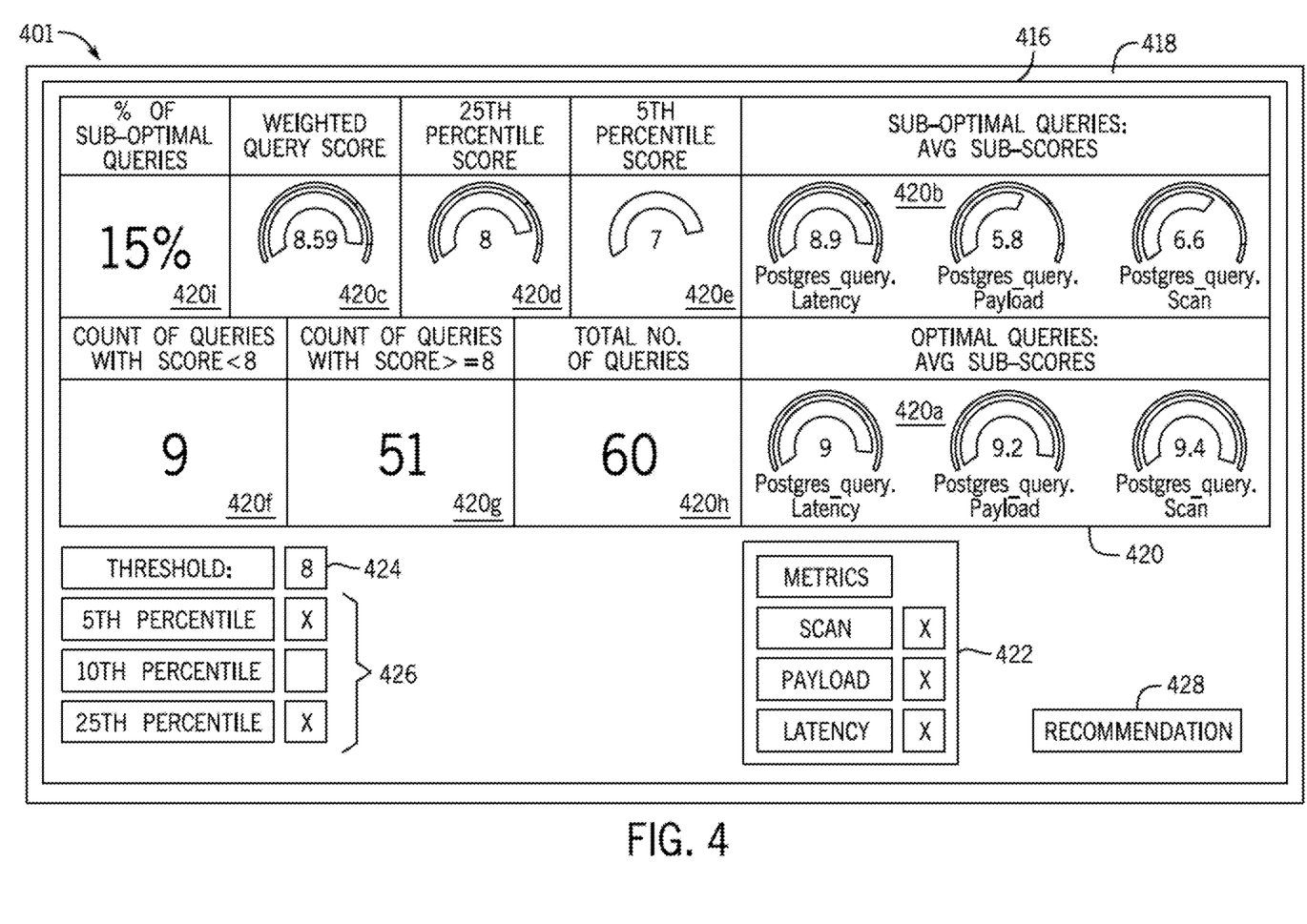
FIG. 4 illustrates a first example of a query score dashboard viewed in a user interface on a display device in accordance with an embodiment of the disclosure.

FIG. 4 illustrates a first example of a query score dashboard 401 viewed in a UI 416 on a display device 418 in accordance with an embodiment of the disclosure. In at least one example, a user can interact with an apparatus (e.g., the apparatus 102 of FIG. 1) or a display device 418 to receive and view the query score dashboard 401 on the UI 416. In at least one example, an overall score can be determined for a query based on the performance of each of the query metrics of the query. For example, if the query receives a sub-score of an eight (8) for latency, a sub-score of a nine (9) for payload, and a sub-score of a six (6) for scan, then the overall score for the query can be the average of those sub-scores. In this way, the query can receive an overall score of 7.67. In another example, the overall score may be or a weighted average of the sub-scores based on the number of query executions that correspond to the overall score. In one example, the numerical scores and sub-scores can be given in whole numbers or in rational numbers.

The query score dashboard 401 can include an input element 424 for a threshold value. In this way, the user can set a threshold value for which specific scores or additional information displayed in the query score dashboard 401 are compared against. In one example, the input element can be a text box. In other embodiments, the input element may be a drop-down box, a slider, or the like. In one example, the user can input a threshold value before an analysis of a query performance is performed. In yet another example, the user can receive an initial analysis of the query performance, and then modify the threshold value and receive a second analysis related to the new threshold value.

As illustrated in FIG. 4, the query score dashboard 401 can include a plurality of panels 420 such that each panel 420 can display information regarding the performance of specified query metrics for the query and/or additional information associated with the query. In one example, the panel 420a can display additional information regarding selected query metrics associated with the optimal queries, the optimal queries being the average sub-scores of the collected query data. The average sub-scores can be the average of the query metric sub-scores collected for each query. In at least one example, the optimal queries and the average sub-scores can be determined by the sub-scores of the query metrics for all queries that received an overall score higher than the threshold value. For example, if the threshold value is set at 8, as illustrated in FIG. 4, the optimal query metric sub-scores displayed in panel 420a relate to the queries with an overall score higher than the threshold of 8. In this way, panel 420a displays that for all queries that received an overall score higher than the threshold of 8, the average latency score was a 9, the average payload score was a 9.2, and the average scan score was a 9.4.

As illustrated in FIG. 4, the query metrics can be scan, payload, and latency. As disclosed before, the overall query score and the sub-scores can be scored numerically between one and ten (e.g., with ten being the best score) in some embodiments. In one example, the display of each query metric sub-score in the panel 420a can be color coded to ease the review by the user. In this way, a good sub-score can be corelated to a green color, an average sub-score can be corelated to a yellow color, and a poor sub-score can be corelated to a red color, although other embodiments are not limited to this implementation. It should be understood that the colors corelating to the scores can be customized to a user's likeness.

As illustrated in FIG. 4, the panel 420b can be similar to the panel 420a, but the panel 420b can display information regarding sub-optimal average sub-scores. In one example, the sub-optimal average sub-scores can be determined by displaying the sub-scores of the queries that received an overall score equal to or less than the threshold value.

As illustrated in FIG. 4, panels 420c, 420d, and 420e can be configured to display further information related to the overall query score. For example, panel 420c can display information regarding the overall query score (e.g., the weighted query score). In one embodiment, the weighted query score can be determined by taking the average scores of all the queries in the request and weighting them based on the number of query executions corresponding to the query score. Panel 420h can display the total number of queries that a score has been determined for the query score dashboard 401. As illustrated in FIG. 4, panel 420h illustrates the total number of queries is sixty (60). In this example, the summation of all overall query scores were then weighted against the total number of queries to average out and determine a weighted query score of 8.59, as illustrated in FIG. 4.

In one example, panel 420d and panel 420e can display information regarding percentile scoring. In one example, the query score dashboard 401 can include a percentile scoring section 426 that includes input elements configured to enable the user to select, for example, a $5^{th}$ percentile, a $10^{th}$ percentile, a $25^{th}$ percentile, or any other percentile values (e.g., entering an "x" in the text box). As illustrated in FIG. 4, the query score dashboard 401 shows the $5^{th}$ percentile and the $25^{th}$ percentile are chosen with the $5^{th}$ percentile in panel 420e and the $25^{th}$ percentile in the panel 420d. Although not illustrate in FIG. 4, it should be understood the user can select fewer or more than two percentile scores to be displayed in the query score dashboard 401, and the query score dashboard 401 can be configured to fit more panels 420 such that all information selected by the user is displayed. In one example, the $5^{th}$ percentile score can be determined by ranking all overall query scores in descending order and then taking the $5^{th}$ percentile score. In another example, the $25^{th}$ percentile score can be determined by ranking all overall query scores in descending order and then taking the $25^{th}$ percentile score.

The query score dashboard 401 can further be configured to display other panels 420 of information. In one example, the panel 420f can display the number of queries that received an overall score less than the threshold value. In yet another example, the panel 420g can display the number of queries with an overall score that is equal to or greater than the threshold value. In one example, the panel 420i can be configured to display a percent of sub-optimal queries. The percent of sub optimal queries can be determined by taking the value in the panel 420f, the number of queries with scores under the threshold, and dividing it by the total number of queries, in panel 420h to derive a percentage. In this way, the user can be alerted easily to the percentage of queries that are underperforming. In one example, as illustrated in FIG. 4, the query score dashboard 401 can include a query metric selector 422 that includes input elements that enable the user to select which query metrics to score the queries on and what query metric information is to be displayed in the query score dashboard 401. In another embodiment, the input elements in the query metric selector 422 may be configured to receive user inputs to modify the percent of each query metric sub-score that is used in the computation of the overall score for the query. As described earlier, the weighted average can be determined using 30% of the latency sub-score, 20% of the payload sub-score, and 50% of the scan sub-score score. In some embodiments, a user can modify the percentages of the sub-scores using the query metric selector 422.

As discussed above, the threshold can be modified by the user via the input element 424 on the query score dashboard 401. In one example, the apparatus can analyze the performance of a query such that the query can be scored based on the query metrics chosen by the user. Each query metric can be compared against an empirically found value (e.g., a default value) configured to be the optimal performance of each query metric. The empirically found value can be replaced by a user customized value to measure against each query metric. The sub-score of each query metric is compared against the empirically found value to determine a sub-score. The sub-score of each metric can then be averaged to determine an overall score for a query. In one example, multiple queries can be analyzed, and scores determined for the multiple queries concurrently or simultaneously. In one example, the user can input a threshold value to compare against the multiple query scores collected. As discussed above, the information in some or all of the panels may be dependent on the threshold value.

One or more recommendations 428 can be displayed in the query score dashboard 401 or in a different UI. The recommendations may be provided based on an analysis of the of the query performance. The recommendation(s) can be related to improving the query performance. Additionally or alternatively, the recommendations may identify one or more of the query metrics that are underperforming. In some instances, the recommendations may provide information that can improve the results of the additional information.

In one example, a first UI can be transmitted to an apparatus that can be configured to receive a query and a first query metric. The computing device (e.g., the computing device 110 of FIG. 1) can receive the query and the first query metric from the apparatus, and the software running on the computing device can analyze and determine a first sub-score for the first query metric. In one example, the user can receive a second or updated UI including the information on the panels with respect to a first threshold value. The user can then modify the threshold value via the input element 424 in the query score dashboard 401, which causes the software on the computing device to determine revised information based on the new threshold. A third or updated UI is transmitted to the apparatus to enable the revised information to be displayed to the user.

In at least one example, the information (e.g., the panels 420a-420i) illustrated in FIG. 4 can be configured to be linkable to display specific information regarding the data collected. In one example, a user can select a panel 420a-420i and the panel 420a-420i can be configured to generate a new UI to represent the data of the selected panel 420a-420i. In another example, the UI of the query score dashboard 401 can include links to other UIs to present information regarding query performance such as trend information, score distribution, query index, and any other additional information.

Figure 5:
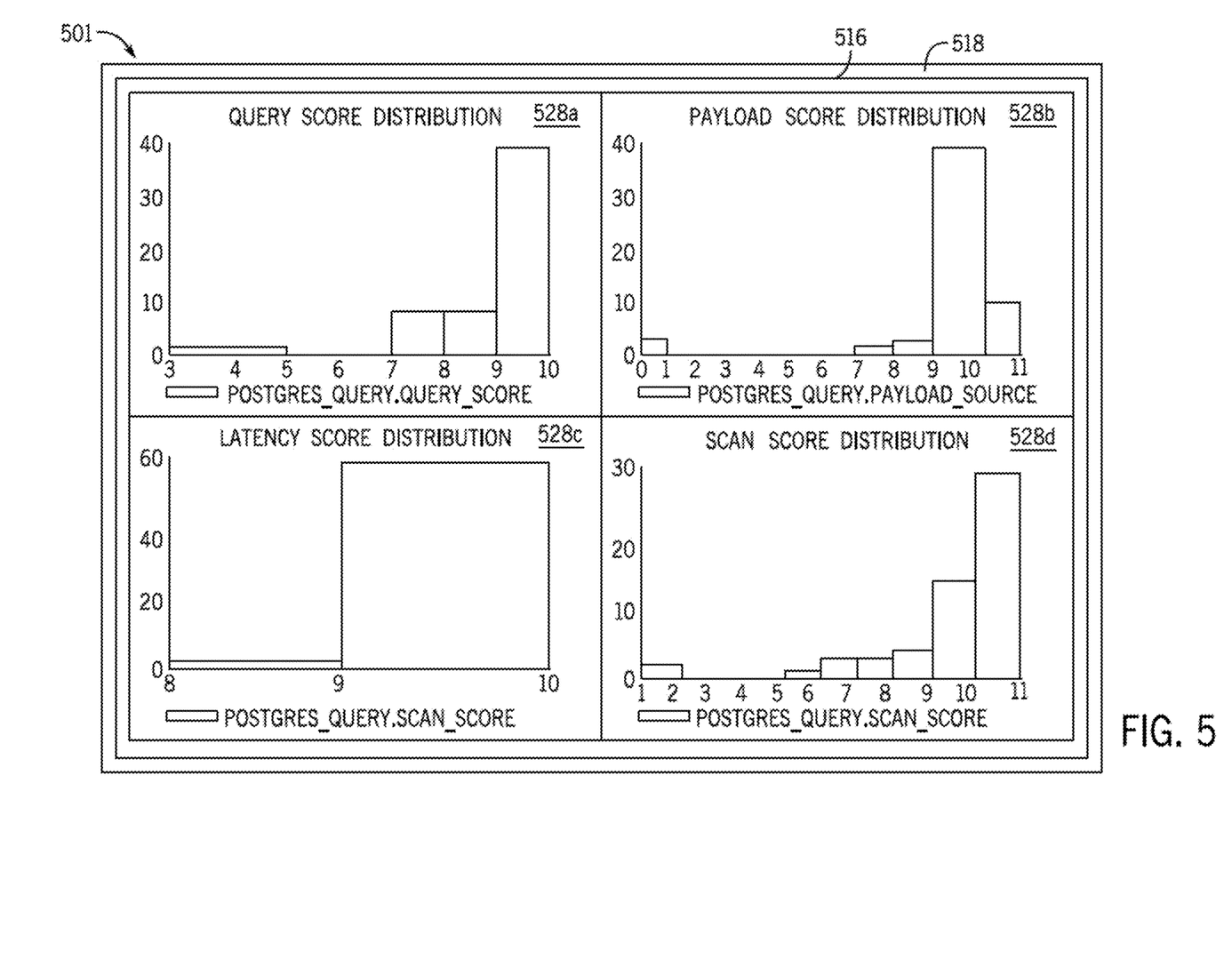
FIG. 5 illustrates a second example of a query score dashboard viewed in a user interface on a display device in accordance with an embodiment of the disclosure.

FIG. 5 illustrates a second example of a query score dashboard 501 viewed in a UI 516 on a display device 518 in accordance with an embodiment of the disclosure. In the illustrated embodiment, the x-axis in the panels 528a, 528b, 528c, and 528d relate to the numerical scores and sub-scores and the y-axis to the number of queries. As illustrated in FIG. 5, the query score dashboard 501 can be configured to present score distributions of the overall scores for the queries and the sub-scores for the query metrics. In at least one example, the user can navigate to the query score dashboard 501 using a link provided in another UI (e.g., the query score dashboard 401 of FIG. 1). The query score dashboard 501 can present the score distributions as a bar graph, a histogram, a pie graph, a line graph, or other chart. In another example, the query score dashboard 501 can include two or more panels.

As illustrated in FIG. 5, the query score dashboard 501 can display four panels 528a, 528b, 528c, and 528d that can display different score distributions related to different information. In one example, the panel 528a can be configured to display a histogram of the distribution of the overall query scores. Panel 528a can provide the number of queries and the overall scores associated with the queries. In one example, the other panels 528b, 528c, and 528d can include score distribution histograms related to the query metrics of payload, latency, and scan, respectively. This can be advantageous, as the histograms can display the distributions of the sub-scores to help the user understand which, if any, query metrics are not performing well.

Figure 6:
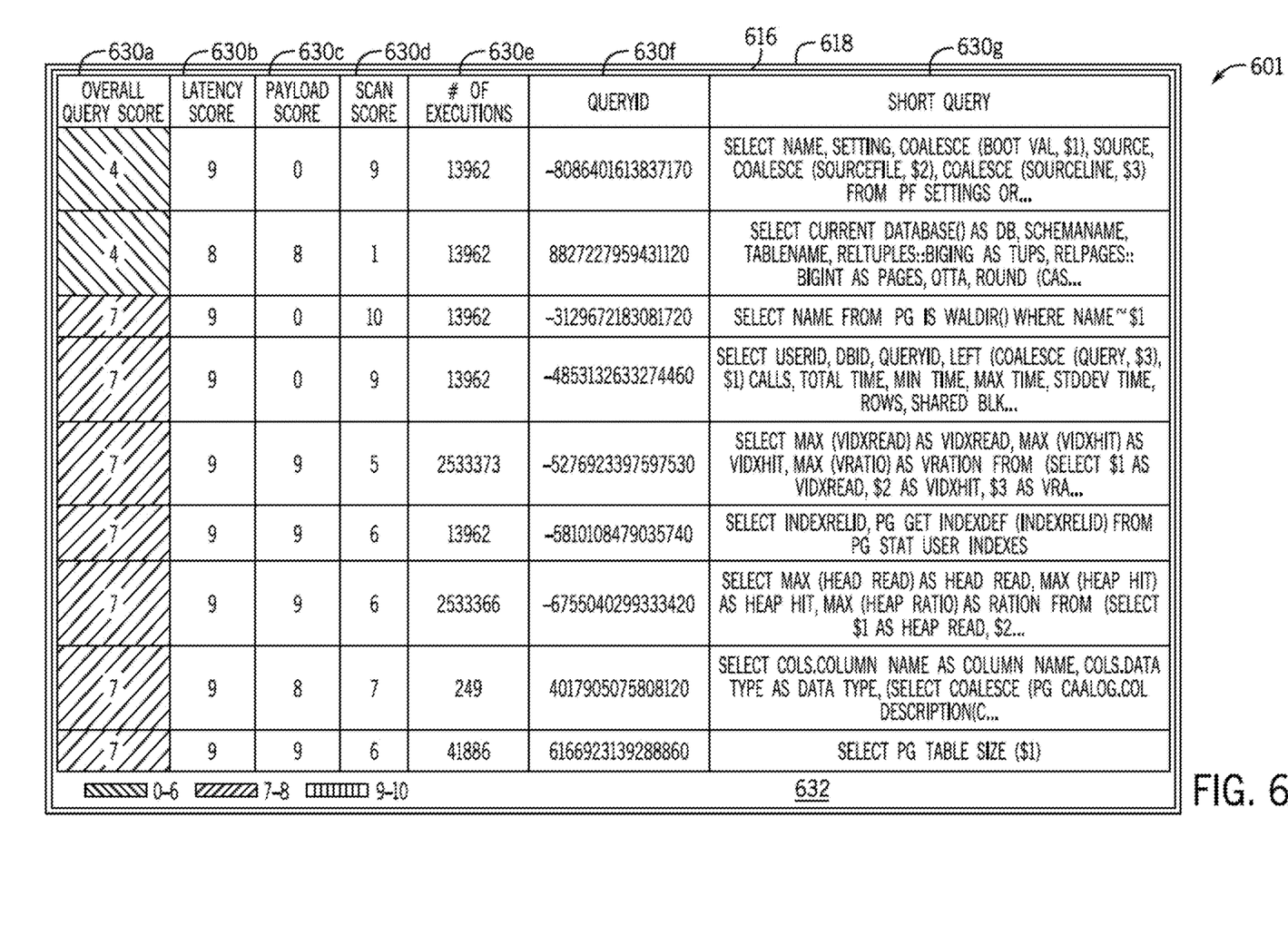
FIG. 6 illustrates a third example of a query score dashboard viewed in a user interface on a display device in accordance with an embodiment of the disclosure.

FIG. 6 illustrates a third example of a query score dashboard 601 viewed in a UI 616 on a display device 618 in accordance with an embodiment of the disclosure. As illustrated in FIG. 6, the query score dashboard 601 can be configured to display information on the queries. In FIG. 6, the query score dashboard 601 presents a spreadsheet configured to display individual queries and details regarding each query. In one example, the spreadsheet can include columns related to the query. As shown in FIG. 6, the columns include information on the overall query score 630a, latency sub-score 630b, payload sub-score 630c, scan sub-score 630d, the number of executions 630e, query identifier (ID) 630f, and the queries 630g.

The boxes in the overall query score 630a column can be highlighted based on the overall score for each query. The highlighting can indicate a quality of the query or a score range the overall score falls within. The highlighting can be implemented as color coding, a gradient, shading or some other effect. The query score dashboard 601 can include a legend or key 632 to display what the highlighting represents. In the illustrated embodiment, the key 632 displays ranges of overall scores that are represented by the shading in each box in the column 630a. In other embodiments, the highlighting may represent the quality of a query, such as good, average, and poor.

The columns 630b, 630c and 630d can include the sub-scores for the latency, payload, and scan query metrics, respectively. The number of executions 630e column can present the number of executions for each query, and the query ID 630f column lists an ID for each query. The queries 630g column includes a copy of the query used to access the database(s).

In at least one example, the query score dashboard 601 can include a search bar (not shown in FIG. 6) to enable a user to search a query ID to display the information associated with that query (e.g., the overall score, the sub-scores and the query metrics). Additionally or alternatively, the query ID can be implemented as a link that when selected, causes information to be displayed.

Figure 7:
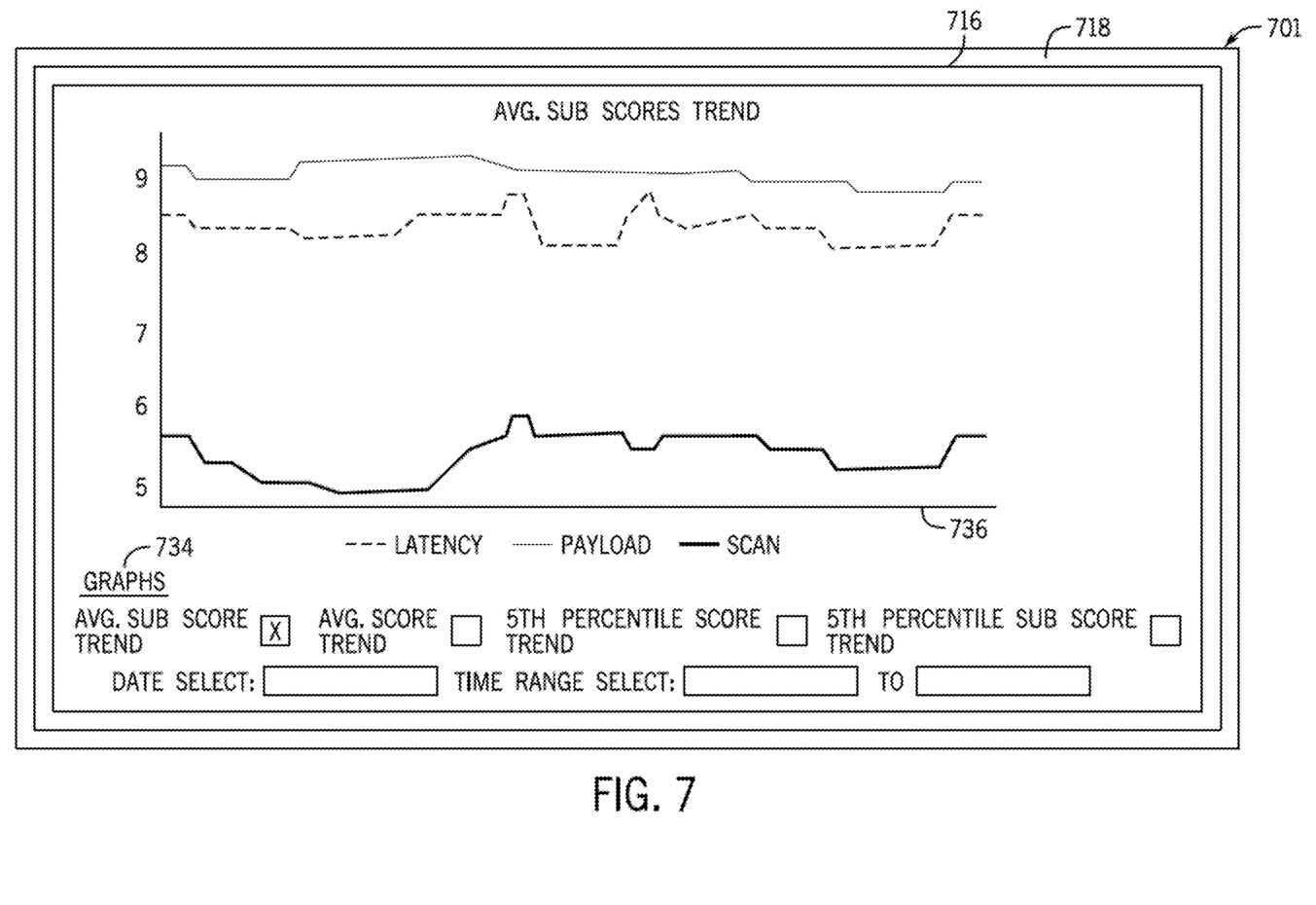
FIG. 7 illustrates a fourth example of a query score dashboard viewed in a user interface on a display device in accordance with an embodiment of the disclosure.

FIG. 7 illustrates a fourth example of a query score dashboard 701 viewed in a UI 716 on a display device 718 in accordance with an embodiment of the disclosure. As illustrated in FIG. 7, the query score dashboard 701 can be configured to display trends in the sub-scores of the query metrics. A graph 736 shows plots of averages of the sub-scores of the query metrics over a period of time. The x-axis represents time and the y-axis sub-score values. In the illustrated embodiments, the query metrics include latency, payload, and scan.

In at least one example, the query score dashboard 701 can include a graph selection section 734 that includes input elements configured to receive user inputs regarding the information presented in the query score dashboard 701. A user can select an input element, shown in the illustrated embodiment as a text box. As illustrated in FIG. 7, the average sub scores trend is selected (based on "x" in associated text box). In other embodiments, the user can select different graphs to display via the input elements (e.g., the text boxes). In other embodiments, the input elements may be implemented as another type of input element, such as a drop-down menu.

The graph selection section 734 may further include fillable input elements, such as date selection and a time range selection. As illustrated in FIG. 7, the graph 736 can be a line graph and can include sub-score trends within the date and time range selected. In other embodiments, the graph 736 can include a histogram, a bar graph, a pie graph, or any other graph.

Figure 8:
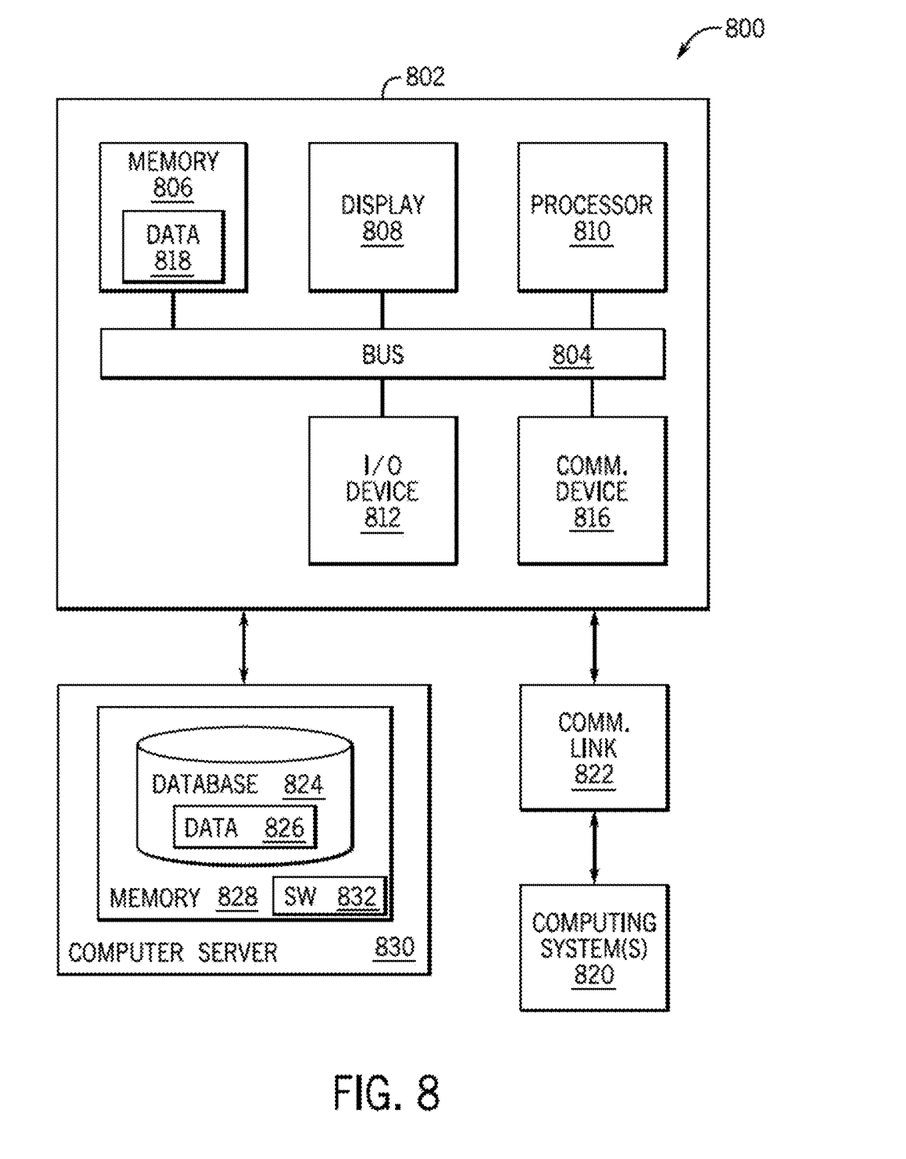
FIG. 8 illustrates a block diagram of an example computing system for implementing various embodiments in the examples described herein.

The systems, methods, and user interfaces disclosed herein may be implemented using various computing systems. FIG. 8 illustrates a block diagram of an example computing system for implementing various embodiments in the examples described herein. For example, the apparatuses 102 and the computing device shown in FIG. 1 may include or be implemented as the computing system 800. This disclosure contemplates any suitable number of computing systems 800. For example, the computing system 800 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 800 may include one or more computing systems; be unitary or distributed; span multiple locations; span multiple locations; span multiple machines; span multiple data centers; or reside in a cloud, which may include one or more cloud components in one or more networks.

Computing system 800 includes a first computing device 802 that includes one or more communication structures, such as a bus 804 (e.g., an address bus and a data bus) or other communication mechanism for communicating information, which interconnects subsystems and devices, such as memory 806, a display 808, a processor 810, an input/output device 812, and a communications device 816. Although only one of each component is shown in FIG. 8, other embodiments can include one or more of the bus 804, the memory 806, the display 808, the processor 810, the input/output device 812, and/or the communications device 816.

The memory 806 is configured to store information, such as data and software applications (collectively data 818). In one embodiment, the data 818 can include one or more databases and/or query data that is stored in the database(s) and processor-executable instructions for one or more software applications. The data 818 can include different or additional data in other embodiments. The memory 806 may be implemented as one or more types of volatile and non-volatile memory. For example, the memory 806 can be a read only memory (ROM), dynamic and/or static random-access memory (RAM), flash memory, cache memory, erasable programmable ROM (EPROM), electrically erasable programmable ROM (EEPROM), virtual memory, optical memory, magnetic memory, and combinations thereof.

In particular embodiments, the processor 810 includes hardware for executing processor-executable instructions, such as the instructions in a software application. The processor 810 includes circuitry for performing various processing functions, such as executing specific software for performing specific calculations or tasks. For example, the processor 810 may be implemented as a microprocessor, a central processing unit, a graphics processing unit, a neural processing unit, a digital signal processor, or combinations thereof.

The bus 804 can include one or more memory buses (which may each include an address bus and a data bus) that couple the processor 810 to the memory 806. In particular embodiments, one or more memory management units (MMUs) reside between the processor 810 and the memory 806 and facilitate accesses to the memory 806 as requested by the processor 810. In particular embodiments, the bus 804 includes hardware, software, or both coupling components of the computing device 802 to each other.

The display 808 includes circuitry and a display screen and is configured to present information on the display screen. The display 808 can be the display device 418, 518, 616, 718 shown in FIGS. 4, 5, 6, and 7, respectively, and may be used to display the information and user interfaces described herein.

In particular embodiments, the I/O device 812 includes hardware, software, or both, providing one or more interfaces for communication between the I/O device 812 and other components within the computing device 802 and/or external to the computing device 802. One or more of the I/O devices 812 may enable communication between a user and the computing device 802. The I/O device 812 can include, but is not limited to, a keyboard, a keypad, a mouse, a microphone, speakers, input buttons, and combinations thereof. In some embodiments, the display 808 may also function as an I/O device when the display 808 is implemented as a touchscreen display that is configured to receive touch and/or force inputs as well as display information.

In particular embodiments, the communication device 816 includes hardware, software, or both providing one or more interfaces for communication (such as, for example, packet-based communication) between the computing device 802 and one or more other computing devices 820 and/or one or more computer servers 830. Example communications devices 816 include, but are not limited to, a modem, an Ethernet card, a network interface controller (NIC) or network adapter for communicating with an Ethernet or other wire-based network, a wireless NIC (WNIC) or wireless adapter for communicating with a wireless network, such as a WI-FI network, and combinations thereof.

According to particular embodiments, the computing device 802 performs specific operations by the processor 810 executing one or more sequences of one or more processor-executable instructions stored in the memory 806. For example, processor-executable instructions for one or more of the UIs, for accessing one or more databases, for one or more software applications, for displaying information and the UI(s), a website, and/or one or more of the methods described herein may be stored in the memory 806 and may be executed by the processor 810. Such processor-executable instructions may be read into the memory 806 from another computer readable/usable medium, such as removable computer readable/usable medium (e.g., memory sticks, external hard drives). In alternative embodiments, hard-wired circuitry may be used in place of or in combination with processor-executable instructions. Thus, particular embodiments are not limited to any specific combination of hardware circuitry and/or software. In various embodiments, the term "logic" means any combination of software or hardware that is used to implement all, or part of particular embodiments disclosed herein.

The term "computer readable medium" or "computer usable medium" as used herein refers to any medium that participates in providing instructions to processor 810 for execution. Such a medium may take many forms, including but not limited to, nonvolatile media and volatile media.

The computing device 802 may transmit and receive messages, data, and instructions, including software applications (or processor-executable instructions) through a communications link 822 and the communications device 916. Received processor-executable instructions may be executed by the processor 810 as it is received, and/or stored in the memory 806 for later execution. In various examples, the communications link 822 may be configured as a network (e.g., the network 106 of FIG. 1) to enable the computing device 802 to communicate with, for example, apparatuses (e.g., the apparatus 102 of FIG. 1).

The database 824 represents one or more databases that can be accessed by the computing device 802 by way of the communications device 816. The database 824 can be stored in a memory 828 that is included in a computer server 830. In some embodiments, the software 832 of the disclosure can be stored within the computer server 830. The memory 828 may be implemented similar to the memory 806, and the computer server 830 can be implemented as the computing device 802. As such, the memory 828 and the computing device 830 are not described in detail.

The computing system 800 may further include one or more databases (database 824) that may be used to store data (e.g., query data) and/or software applications (collectively data 826). In one embodiment, the data 826 may include processor-executable instructions for one or more software applications and some or all of the query data. The data 826 can include different or additional data in other embodiments.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of as defined in the claims. Although various embodiments have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements as defined in the following claims.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A system, comprising:
   a processor; and
   a memory configured to store a database and processor-executable instructions, that when executed by the processor, cause operations to be performed, the operations comprising:
      receiving, from a computing device, a query;
      accessing the database to analyze query data based on the query;
      determining a sub-score for each query metric in a set of query metrics, the set of query metrics comprising service level indicators;
      determining an overall score for the query using at least each sub-score; and
      transmitting, to the computing device, the overall score and each query metric in the set of query metrics and the sub-score associated with the query metric.

2. The system of claim 1, wherein the memory stores further processor-executable instructions for:
   generating a user interface (UI) configured to display the overall score, the set of query metrics and the score associated with each query metric in the set of query metrics; and
   transmitting the UI to the computing device.

3. The system of claim 2, wherein:
   the UI is further configured to include one or more panels; and
   at least one panel is configured to be linkable.

4. The system of claim 3, wherein the UI is further configured to present one or more selection elements configured to receive user inputs.

5. The system of claim 4, wherein a selection element in the one or more selection elements is configured to receive a user input to modify a threshold.

6. The system of claim 5, wherein:
the sub-score for a respective query metric is a first sub-score; and
the memory stores further processor-executable instruction for:
determining a second sub-score for the respective query metric based on the user input;
generating an updated UI based on the second sub-score; and
transmitting the second sub-score to the computing device.

7. The system of claim 2, wherein the memory stores further processor-executable instructions for generating additional information associated with the query, the UI configured to display the additional information.

8. The system of claim 7, wherein the UI is configured to display a selection element configured to receive a user input to select the additional information to be generated.

9. The system of claim 1, wherein the memory stores further processor-executable instructions for providing a recommendation to improve a query.

10. The system of claim 1, wherein analyzing the query data occurs simultaneously with processing the query.

11. A method, comprising:
receiving a query;
accessing a database based on the query;
determining a sub-score for each query metric in a set of query metrics based on accessing the database;
determining an overall score for the query using at least the sub-score for each query metric;
receiving a user input to select additional information to be determined, the additional information associated with the query;
providing a user interface (UI) configured to present each query metric and the sub-score associated with the query metric, the overall score for the query, and the additional information.

12. The method of claim 11, wherein accessing the database comprises performing a database search based on the query.

13. The method of claim 11, wherein the set of query metrics comprise at least one of scan, latency, or payload.

14. The method of claim 11, wherein the sub-score for each query metric in the set of query metrics is determined concurrently with accessing the database.

15. The method of claim 11, wherein the UI is further configured to receive user inputs.

16. The method of claim 11, wherein the additional information comprises at least one of a total number of queries, a count of queries having an overall score equal to or greater than a threshold, a percentage of sub-optimal queries, a count of queries having an overall score equal to or less than the threshold, trend information, or a percentile score.

17. The method of claim 16, further comprising receiving a user input to modify the threshold.

18. The method of claim 17, wherein:
the UI is a first UI;
the method further comprises providing a second UI configured to display modified additional information, the modified additional information determined based on the user input.

19. A method, comprising:
receiving, from a computing device, a query;
accessing a database based on the query;
while accessing the database, determining a sub-score for each query metric in a set of query metrics based on the database search, the set of query metrics comprising latency, scan, and payload;
determining an overall score for the query using at least each sub-score;
transmitting, to the computing device, a first user interface (UI) configured to display the overall score, each query metric and the sub-score associated with the query metric, and an input element configured to receive user inputs;
receiving, from the computing device, a user input to select additional information to be determined, the additional information associated with the query;
determining the additional information; and
transmitting, to the computing device, a second UI configured to display at least the additional information.

20. The method of claim 19, wherein the additional information comprises at least one of a total number of queries, a count of queries having an overall score equal to or greater than a threshold, a percentage of sub-optimal queries, a count of queries having an overall score equal to or less than the threshold, trend information, or a percentile score.

* * * * *